United States Patent [19]
Sasaki et al.

[11] Patent Number: 5,750,974
[45] Date of Patent: May 12, 1998

[54] LIGHTING APPARATUS HAVING LIGHT EMITTING DIODES ARRANGED IN A PLURALITY OF PLANES ON A PRINTED CIRCUIT BOARD

[75] Inventors: Ryoichi Sasaki; Naoki Tanai; Masaaki Suhara, all of Osaka, Japan

[73] Assignee: Keyence Corporation, Osaka, Japan

[21] Appl. No.: 635,257

[22] Filed: Apr. 12, 1996

[30] Foreign Application Priority Data

Apr. 13, 1995 [JP] Japan ................................. 7-113854
Apr. 13, 1995 [JP] Japan ................................. 7-125529

[51] Int. Cl.⁶ .......................................................... G06K 7/10
[52] U.S. Cl. .......................... 235/454; 235/455; 235/470; 250/553; 362/249; 362/800
[58] Field of Search ................................. 235/454, 462, 235/470, 472, 455; 250/234, 235, 552, 553; 362/31, 235, 249, 240, 800

[56] References Cited

U.S. PATENT DOCUMENTS

| | | | |
|---|---|---|---|
| 4,847,734 | 7/1989 | Katoh et al. | 362/249 X |
| 4,900,907 | 2/1990 | Matusima et al. | 235/454 X |
| 5,032,960 | 7/1991 | Katoh | 362/240 |
| 5,101,326 | 3/1992 | Roney | 362/800 X |
| 5,280,161 | 1/1994 | Niwa | 235/472 X |
| 5,281,801 | 1/1994 | Shepard et al. | 235/472 |
| 5,291,009 | 3/1994 | Poustaei | 235/472 |
| 5,349,172 | 9/1994 | Roustaei | 235/472 |
| 5,397,885 | 3/1995 | Massieu et al. | 235/472 X |
| 5,532,467 | 7/1996 | Roustaei | 235/472 |

*Primary Examiner*—Donald T. Hajec
*Assistant Examiner*—Michael G. Lee
*Attorney, Agent, or Firm*—Sughrue, Mion, Zinn, Macpeak & Seas, PLLC

[57] ABSTRACT

A lighting apparatus includes: a plurality of light emitting diodes; a printed circuit board on which the light emitting diodes are arranged in one row; and a rod-like projection lens disposed in front of the light emitting diodes along a light emitting direction, for irradiating an object with light in a strip-like manner. Each of the light emitting diodes is a chip-type light emitting diode which has a substantially parallelpiped shape and which comprises a light-emitting face and a pair of electrode faces. The light-emitting faces are in a plurality of planes which are perpendicular to one common plane, respectively. An optical information reader has the lighting apparatus.

22 Claims, 7 Drawing Sheets

LIGHTING APPARATUS HAVING LIGHT EMITTING DIODES ARRANGED IN A PLURALITY OF PLANES ON A PRINTED CIRCUIT BOARD

BACKGROUND OF THE INVENTION

The invention mainly relates to a lighting apparatus for an optical information reading apparatus such as a bar code reader.

Conventionally, a bar code reader has been used in which a bar code to be read is irradiated in a strip-like manner with light emitted from a lighting apparatus and a linear CCD receives light reflected from the bar code so that information of the bar code is read. FIG. 11(a) shows an example of a lighting apparatus for such a bar code reader.

Referring to FIG. 11(a), a plurality of light emitting elements 101 are arranged in one row on a printed circuit board 100. Each light emitting element 101 constitutes a light emitting diode (hereinafter, abbreviated as LED"). A rod-like projection lens 102 is disposed in front of the light emitting elements 101 along the light emitting direction so that a bar code (which is not shown) is irradiated with light in a strip-like manner. In the projection lens 102, concave curved portions 103 are formed in order to refract the irradiation light, thereby uniformalizing the distribution of the quantity of the irradiation light. Light impinged on the bar code is then received by the linear CCD via a reception lens which is not shown. Due to the characteristics of the reception lens, as shown in FIG. 11(b), the light which has passed through the reception lens, i.e., the light entering the linear CCD becomes smaller in quantity as moving from the center of the lens toward an end of the lens. Therefore, the reading accuracy is lowered at both ends, thereby producing a problem in that the reading width cannot be made large.

In order solve this problem, a lighting apparatus is proposed in which the concave curved portions 103 of the projection lens 102 are formed at positions which are slightly deviated toward the center of the lens with respect to the light emitting elements 101 as shown in FIG. 12(a) and the quantity of light impinged on a bar code is made larger as moving to both ends as shown in FIG. 12(b).

In the above described apparatus, however, the light emitting elements 101 are required to be positioned with a sufficiently high accuracy with respect to the concave curved portions 103 of the projection lens 102. To comply with this requirement, the light emitting elements 101 constituting LEDs must be directly mounted on the printed circuit board 100. This causes the cost for mounting LEDs to be increased. Since the positioning must be performed with a sufficiently high accuracy as described above, furthermore, it is required also to sufficiently perform the positioning between the printed circuit board 100 and the projection lens 102 in the longitudinal direction A, thereby causing the production cost to be increased.

In the conventional apparatus, moreover, the concave curved portions 103 are formed in the projection lens 102. Therefore, the cost of molds for the projection lens 102 which is made of a resin is increased.

SUMMARY OF THE INVENTION

The invention has been conducted in view of the above-discussed defects discussed above.

It is an object of the invention to provide a lighting apparatus in which the distribution of the quantity of irradiation light can be freely set without causing the production cost to be increased.

In order to attain the object, in the invention, chip-type LEDs each of which has a substantially parallelepiped shape and comprises a light-emitting face and a pair of electrode faces are used as LEDs, and the light-emitting faces are in a plurality of planes which are perpendicular to one common plane.

According to the invention, light-emitting faces are in a plurality of planes which are perpendicular to one common plane, respectively, and hence the direction of light emitted from each of the light-emitting faces can be arbitrarily set. Therefore, the distribution of the quantity of light can be set in an arbitrary manner in which, for example, the quantity of light at one end can be set larger than that at the center.

DETAILED DESCRIPTION OF THE PREFERRED EMBODIMENTS

Hereinafter, embodiments of the invention will be described with reference to the accompanying drawings.

FIGS. 1 to 6 show a first embodiment.

Figure 1:
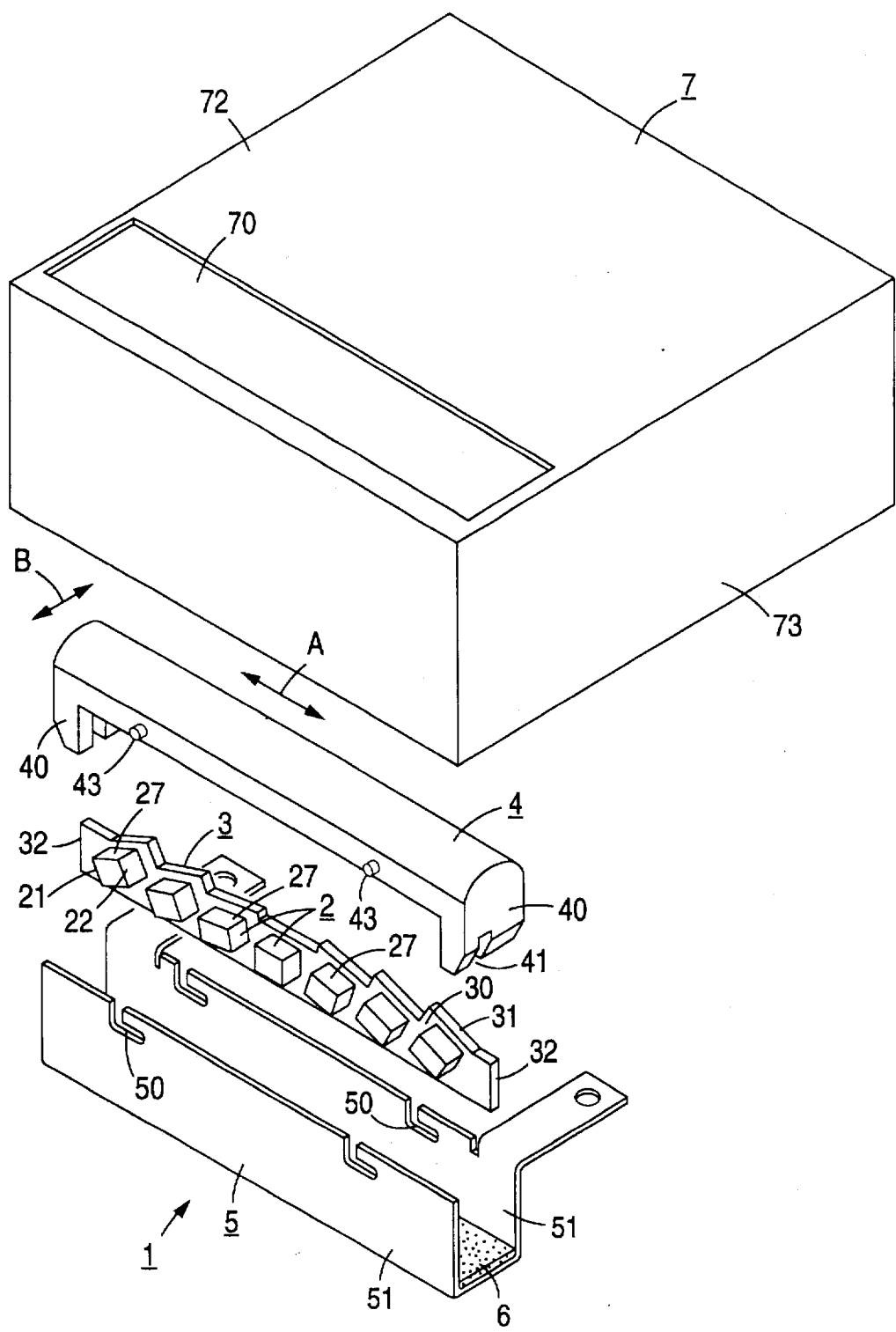
FIG. 1 is an exploded perspective view of a lighting apparatus which is a-first embodiment of the invention.

Referring to FIG. 1, a lighting apparatus 1 for a bar code reader (the optical information reading apparatus) comprises: a printed circuit board 3 on which a number of chip-type LEDs 2 having a substantially parallelpiped shape are arranged in one row; a rod-like projection lens 4 which is disposed in front of the chip-type LEDs 2 which are arranged in one row, along the light emitting direction; and a trough-like holder (the holding member) 5.

Figure 2:
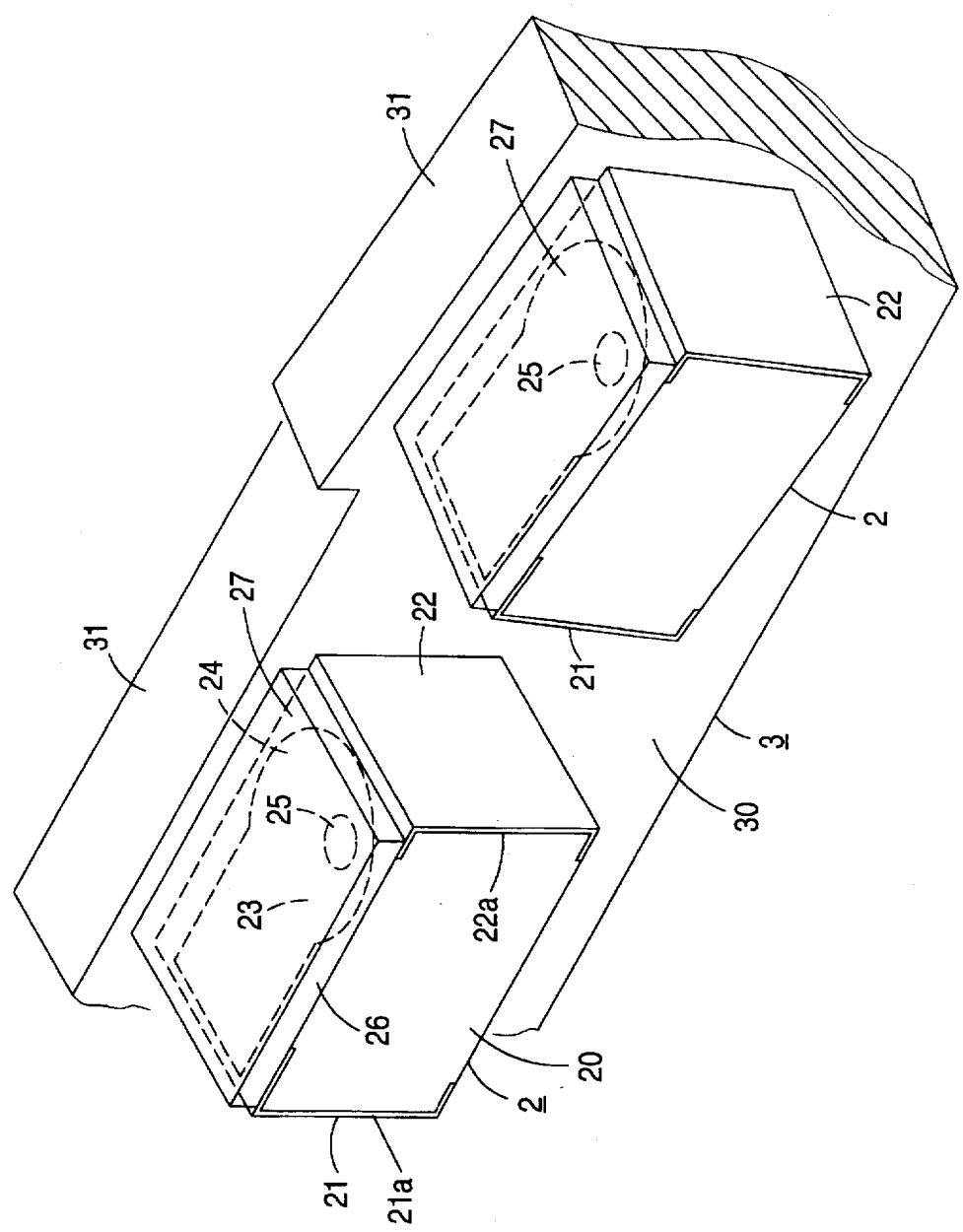
FIG. 2 is an enlarged perspective view of a printed circuit board and chip-type LEDs.

Referring to FIG. 2, the chip-type LEDs 2 which are known and mass-produced have a base 20 which is made of an insulating material such as a resin or glass epoxy and has a substantially parallelpiped shape. A pair of first and second electrode faces 21 and 22 which are parallel to each other are formed on the side faces of the base 20, respectively. A recess 23 indicated by a broken line is formed in the upper face of the base 20. A part of the recess 23 is formed as, for example, a paraboloid of revolution. The paraboloid of revolution is covered by metal foil which is continuous with the second electrode face 22, thereby forming a reflecting face 24. A light emitting element 25 is disposed in the recess 23, and the whole of the recess 23 is covered by a transparent resin 26, thereby forming a light emitting face 27. The light emitting element 25 is electrically connected in the recess 23 to the first and second electrode faces 21 and 22. The metal foil pieces 21a and 22a serving as the first and second electrode faces 21 and 22 have a U-like section shape and extend to the side opposite to the light emitting face 27.

Figure 12:
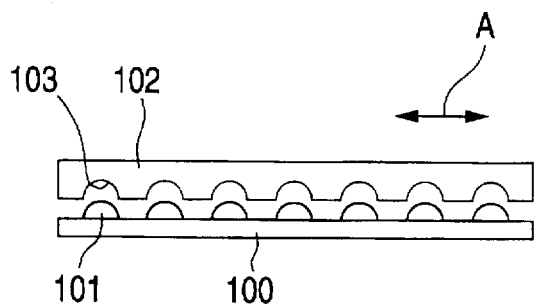
FIG. 12(a) is a front view of another conventional lighting apparatus.
FIG. 12(b) is a characteristic graph showing distribution of the quantity of irradiation light.
Figure 12:
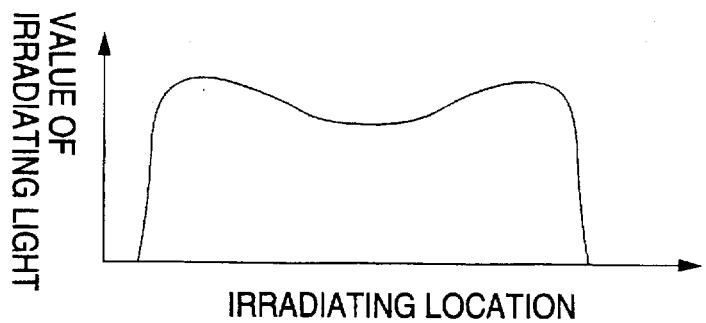

The light emitting face 27 is adjacent and perpendicular to the first and second electrode faces 21 and 22. In a posture wherein the three faces 27, 21, and 22 of each of the chip-type LEDs 2 are perpendicular to the surface 30 of the printed circuit board 3, the first and second electrode faces 21 and 22 are soldered to lands (not shown) of the printed circuit board 3 so that the chip-type LEDs 2 are mounted on the printed circuit board 3. The light emitting faces 27 are in a plurality of planes which are perpendicular to the surface (the one common plane) 30 of the printed circuit board 3, respectively. In this embodiment, each the light emitting diodes has an inclined angle with respect to the object to be irradiated, and the inclined angle of the light emitting diode located near the center of the printed circuit is larger than the light emitting diode located far the center of the printed circuit. In other words, the light emitting faces 27 are positioned so as to be directed to the ends of the projection lens 4 as shown in FIG. 1, therefore, the distribution of the quantity of light can be set so as to be larger at the ends of the lens as shown in FIG. 12(b). The edge 31 of the printed circuit board 3 which is in the side of the projection lens 4 has a shape elongating along the light emitting faces 27, thereby preventing light emitted from the light emitting faces 27 from being blocked by the printed circuit board 3.

Figure 3:
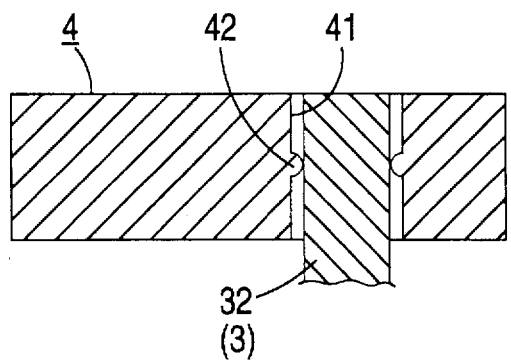
FIG. 3 is a plan section view showing a positioning groove.

The projection lens 4 is a column-like lens or cylindrical lens which is made of a resin. A board supporting portion 40 is formed at each end of the projection lens 4 in the longitudinal direction so as to be integrated with the projection lens 4. A slit-like positioning groove 41 into which the respective end 32 of the printed circuit board 3 is to be inserted is formed in each of the board supporting portions 40. The slit-like positioning grooves 41 have a width which is approximately equal to the thickness of the printed circuit board 3. As shown in FIG. 3, a pair of rib-like protrusions 42 are formed in each slit-like positioning groove 41 of the projection lens 4 so that variation in thickness of the printed circuit board 3 is absorbed.

Figure 4:
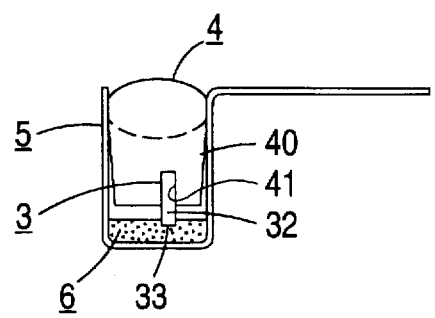
FIG. 4 is a side view of the lighting apparatus.

FIG. 4 is a side view of the lighting apparatus. Referring to FIG. 4, the holder 5 is made of a metal and houses and holds the projection lens 4 and the printed circuit board 3. A sponge (the elastic member) 6 is laid on the bottom face of the holder 5. An edge 33 of the printed circuit board 3 which is in the side opposite to the projection lens 4 pressingly contacts with the sponge 6.

Returning to FIG. 1, two engagement protrusions 43 are integrally formed on each side face of the projection lens 4. On the other hand, engagement notch portions 50 each having an L-like notch are formed in a pair of side plates 51 of the holder 5. The engagement notch portions 50 guide the engagement protrusions 43 and as shown in FIG. 5 engage at the inner most position with the engagement protrusions 43.

Figure 5:
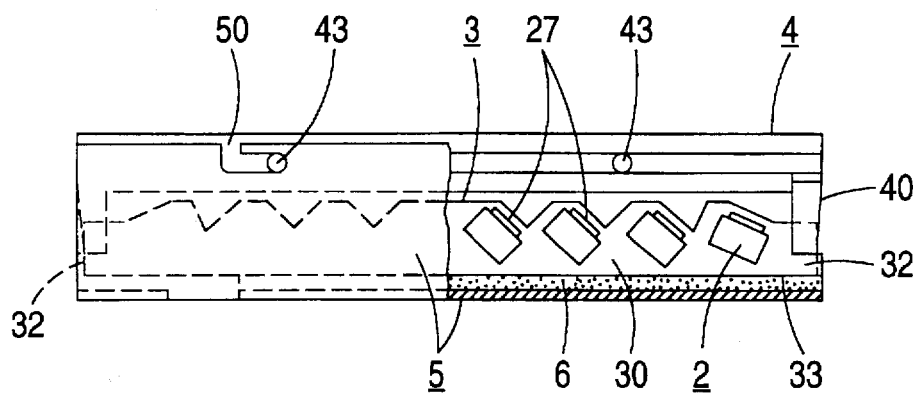
FIG. 5 is a front view of the lighting apparatus in which a part of a holding member is cut away.
Figure 6:
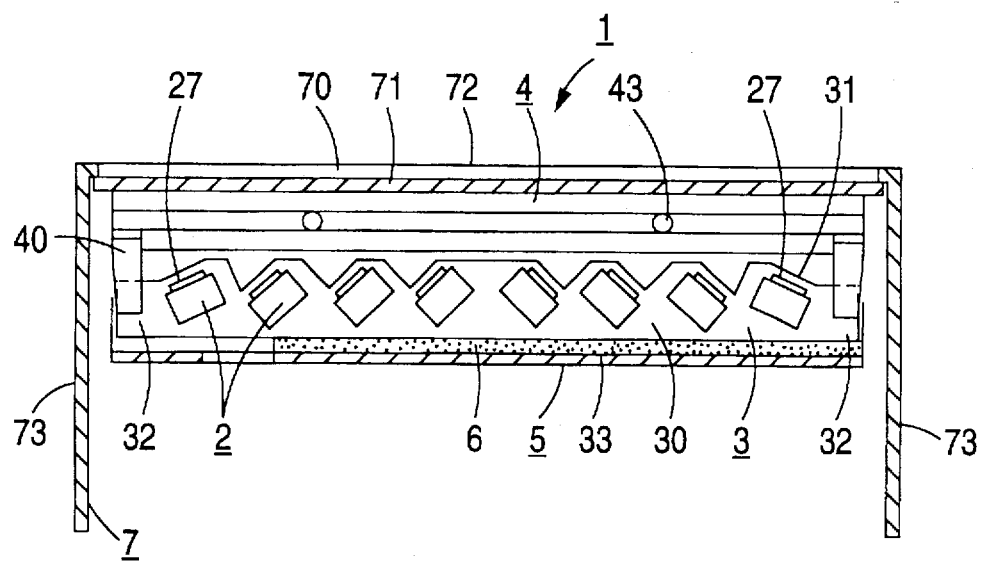
FIG. 6 is a section view of the lighting apparatus housed in a case.

As shown in FIGS. 5 and 4, the holder 5 which accommodates the printed circuit board 3 and the projection lens 4 is fixed into the case 7 of the bar code reader of FIG. 1. In the case 7, a window 70 is formed at a position opposing the projection lens 4. As shown in FIG. 6, the window 70 is provided with a window member 71 and allows light which is emitted from the chip-type LEDs 2 via the projection lens 4, to pass through the window. The light irradiates the bar code (the object) in a strip-like manner. The light reflected from the bar code enters the case via the window 70 and is then received by the linear CCD via the reception lens which is not shown.

In the thus configured lighting apparatus 1, the light emitting elements 25 shown in FIG. 2 are not directly bonded to the printed circuit board 3, and the chip-type LED 2 are mounted on the printed circuit board 3. Consequently, the chip-type LED 2 can be mounted by a general purpose mounting machine so that the mounting cost can be reduced. Since the positional accuracy of the chip-type LEDs 2 in the longitudinal direction of the projection lens 4 in FIG. 1 is not so severe, furthermore, the mounting cost can be reduced. Unlike the conventional apparatus, it is not required to form concave curved portions or the like in the projection lens 4 of FIG. 6, and hence the cost of molds for the projection lens 4 can be reduced.

Figure 10:
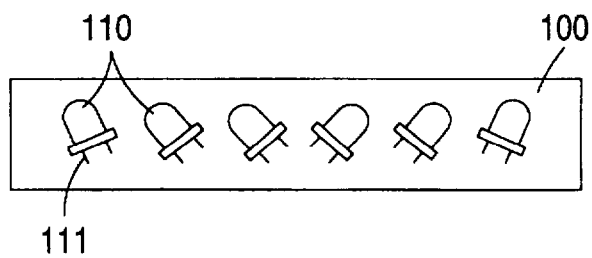
FIG. 10(a) is a front view of a lighting apparatus which is outside the scope of the invention.
FIG. 10(b) is a section view of the lighting apparatus of FIG. 10(a)
Figure 10:
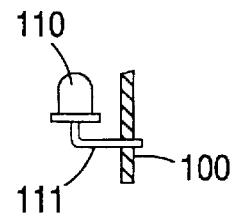
Figure 11:
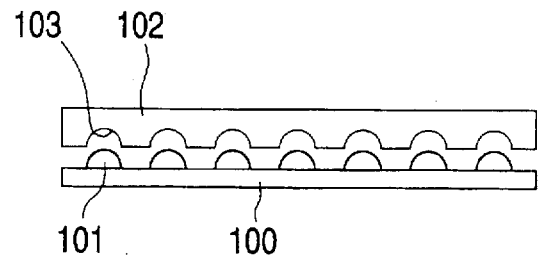
FIG. 11(a) is a front view of a conventional lighting apparatus.
FIG. 11(b) is a characteristic graph showing distribution of the quantity of light entering a linear CCD.
Figure 11:
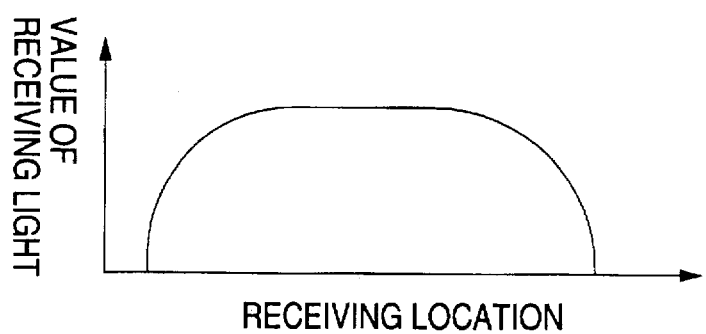

It may be contemplated that so-called discrete-type LEDs 110 shown in FIG. 10(a) are used in place of the chip-type LEDs 2. However, this configuration causes a lighting apparatus to be increased in size because the discrete-type LEDs 110 are larger than the chip-type LEDs 2 of FIG. 6. By contrast, the lighting apparatus 1 uses the chip-type LEDs 2, and hence the apparatus is prevented from being increased in size.

When the discrete-type LEDs 110 of FIG. 10(a) are to be used, two lead wires 111 must be inserted into through holes. This produces problems in that it is difficult to mount such LEDs while bending the lead wires as shown in FIG. 10(b), and that three-dimensional positioning of the discrete-type LEDs 110 having the two lead wires 111 is difficult to do. By contrast, in the lighting apparatus 1 of FIG. 1, the chip-type LEDs 2 having a parallelpiped shape are mounted on the printed circuit board 3. Consequently, the process of mounting the LEDs can be easily done.

In the lighting apparatus 1, the deviation of the optical axis of each chip-type LED 2 from that of the projection lens 4 must be eliminated so as to improve the quality, by positioning the printed circuit board 3 in the directions B which are perpendicular to the longitudinal directions A of the projection lens 4. In the embodiment, the positioning grooves 41 are formed in the board supporting portions 40 of the projection lens 4 so that the positioning of the printed circuit board 3 is performed only by inserting the board into the grooves. Therefore, the printed circuit board 3 can be easily positioned in the directions of the arrows B.

In the embodiment, since the sponge 6 is disposed on the bottom face of the holder 5 and the edge 33 of the printed circuit board 3 shown in FIG. 4 is urged against the sponge 6, the printed circuit board 3 is prevented from rattling and can be provided with sufficient electrical insulation. The elastic member may be configured by fibers such as nonwoven fabric having electrical insulation in place of the sponge 6.

In the embodiment, the engagement notch portions 50 are formed in the holder 50 shown in FIG. 1. When the projection lens 4 is to be attached to the holder 5, therefore, the engagement protrusions 43 can be easily attached along the engagement notch portions 50 without widening the gap between the two side plates 51 of the holder 5 in the directions of the arrows B. Consequently, the assembly property is improved.

Figure 7:
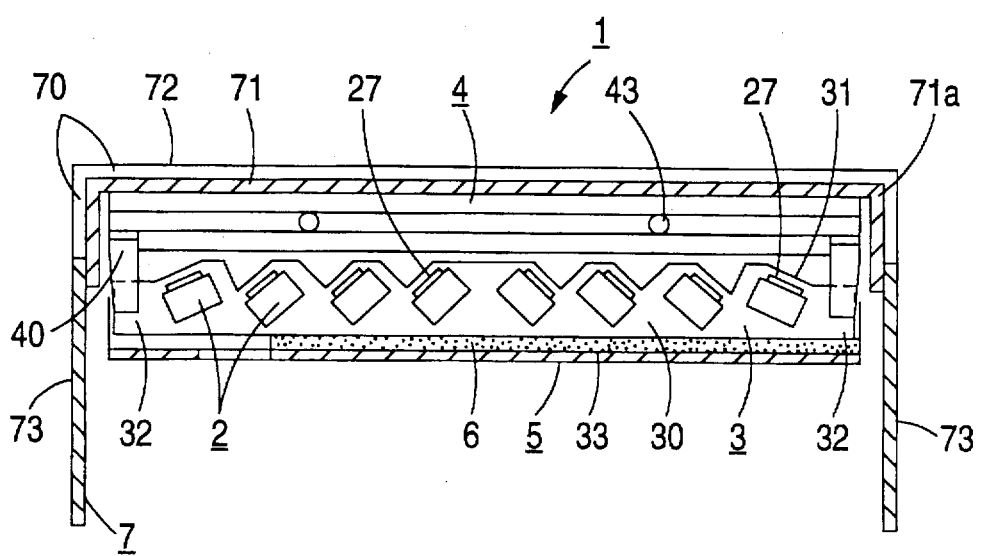
FIG. 7 is a section view showing a modification of the lighting apparatus.

The reading width for a bar code depends on the width of the window 70 shown in FIG. 6. When the window 70 is formed in the front portion 72 of the case 7 and also in side portions 73 which are continuous with the front portion 72 as shown in a modification of FIG. 7, therefore, the reading width can be increased without enlarging the case 7. In this case, the window member 71 is formed so as to have a U-like section shape, and irradiation light can be obtained more uniformly by rounding corners 71a of the window member 71.

Figure 8:
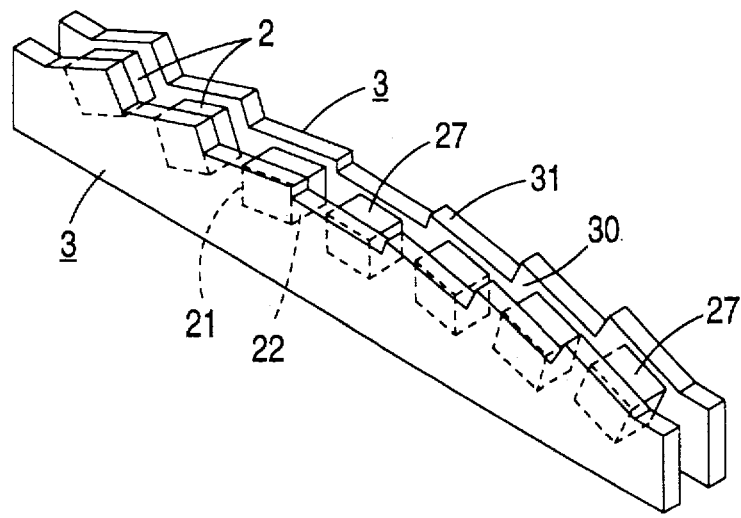
FIG. 8 is an enlarged perspective view of a printed circuit board and chip-type LEDs which are use in a second embodiment.
Figure 9:
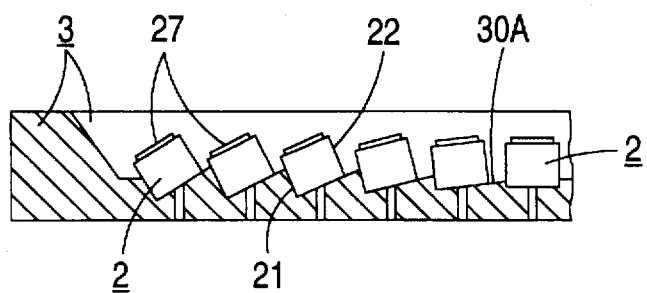
FIG. 9 is an enlarged perspective view of a printed circuit board and chip-type LEDs which are use in a third embodiment.

In the embodiment described above, the single printed circuit board 3 is used. As shown in a second embodiment of FIG. 8, alternatively, the chip-type LEDs 2 may be mounted between two printed circuit boards 3. As shown in a third embodiment of FIG. 9, inclined recesses may be formed in the surface 30A of the printed circuit board 3 and the chip-type LEDs 2 may be then mounted on the surface of the printed circuit board 3. The embodiments of FIGS. 1 and 8 have an advantage that the printed circuit board 3 can be configured by a conventional flat printed circuit board.

In the above, the embodiments in which the invention is applied to a lighting apparatus for a bar code reader have been described. The invention may be applied also to a lighting apparatus for another apparatus such as an image monitor which incorporates a light source and which irradiates an object to be measured with infrared rays or visible light to measure the width, height, length, pitch, or the like of ruggedness of the object, and outputs a result obtained by comparing the measured value with a reference, or the like.

Figure 13:
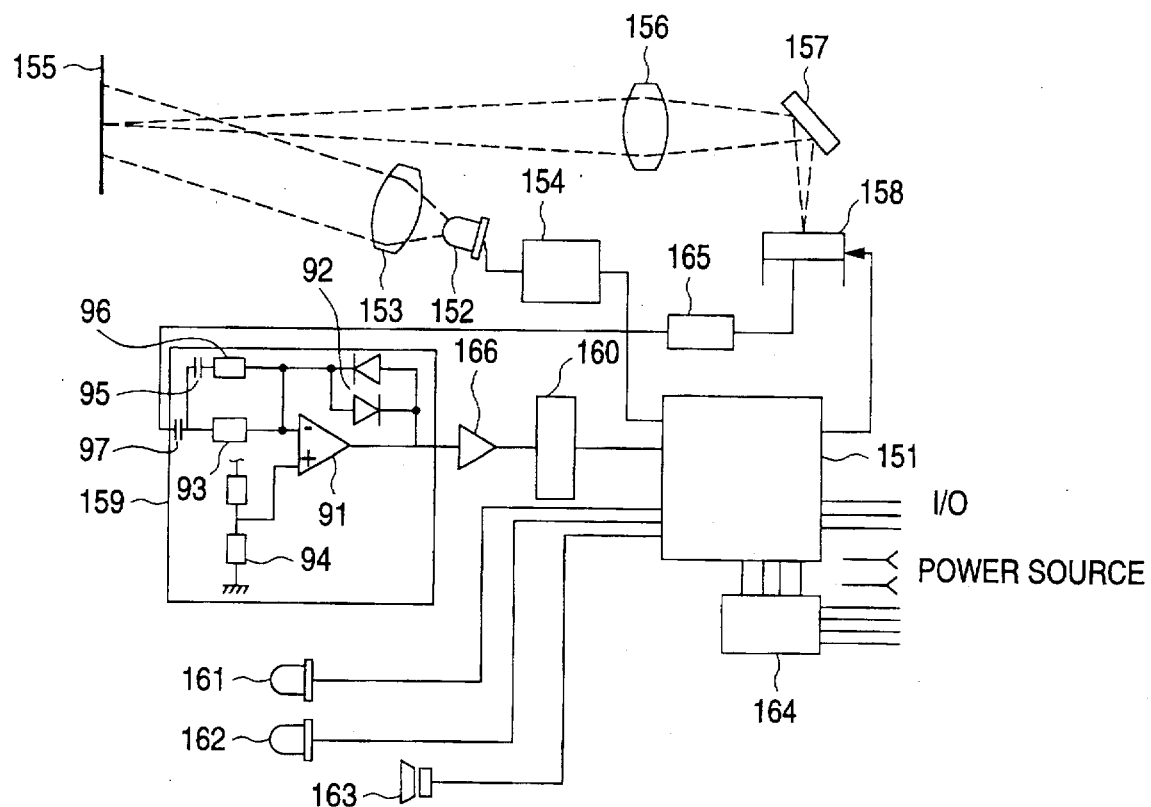
FIG. 13 is a block diagram of an optical information reading apparatus of still further embodiment of the invention.

Hereinafter, still further embodiment of the invention will be described with reference to the accompanying drawings. FIG. 13 is a block diagram of an optical information reading apparatus which has an amplifier circuit. In FIG. 13, a central processing unit (CPU) 151 outputs control signals and instruction signals to various parts and conducts processings such as decoding of a binarized signal. A light source 152 has an LED. The light source 152 is driven by a driving circuit 154 operates on the basis of a driving signal from the central processing unit (CPU) 151. Light emitted from the light source 152 irradiates a member 155 on which information is recorded in the form of a bar code, via a projection lens 153. The light source 152, the driving circuit 154, and the projection lens 153 constitute the irradiating means.

In FIG. 13, a reception lens 156 and a mirror 157 are provided. The reception lens 156 and the mirror 157 constitute the optical system which converges by the reception lens light reflected from the member 155 having information in the form of a bar code and forms an image of the bar code at a predetermined position. An image sensor 158 is configured by a CCD (Charge Coupled Device) in which a number of photoelectric converting elements are arranged in one row. The image sensor is disposed at the position where the image is formed by the optical system. The image sensor 158 is scanned in accordance with a control signal from the central processing unit (CPU) 151 so that electric signals based on the image are sequentially output from the photoelectric converting element placed at an end of the row.

A logarithmic amplifier 159 receives the output of the image sensor 158 via a filter circuit 165 and amplifies the output. A binarizing circuit 160 receives a signal output from the logarithmic amplifier 159 via an amplifier 166 and binarizes the signal. The logarithmic amplifier 159, the binarizing circuit 160, and the central processing unit (CPU) 151 which decodes the binarized signal constitute the processing circuit which processes the signal output from the image sensor 158.

The logarithmic amplifier 159 comprises an operational amplifier 91. An input circuit in which an input resistor 93 and a series circuit of a capacitor 95 and a resistor 96 are connected in parallel is connected to the inverting terminal of the operational amplifier 91. The noninverting terminal is grounded or set to have a predetermined (intermediate level) voltage. In the feedback circuit, nonlinear devices (in the embodiment, diodes are used and, alternatively, transistors may be used) 92 are disposed. The output of the image sensor 158 is input to the operational amplifier via the input circuit.

A capacitor 97 blocks the DC component of the input signal. Lamps 161, 162 are configured by LEDs and indicate the ON/NG and stabilized states. An alarm buzzer 163, and a transceiver 164 are provided.

Figure 14:
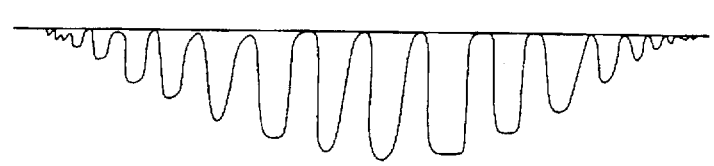
FIG. 14(a) shows an input waveform chart of a logarithmic amplifier of the optical information reading apparatus of FIG. 13.
FIG. 14(b) shows an output waveform chart of a logarithmic amplifier of the optical information reading apparatus of FIG. 13.
Figure 14:

In the thus configured optical information reading apparatus, a lens of a wide field angle may be used as the reception lens 156 constituting the optical system so that the optical information reading apparatus is miniaturized. In this case, the illuminance of the image of the bar code which is formed via the reception lens 156 on the light receiving face of the CCD wherein the arrangement is linear becomes smaller as moving from the center of the reception lens 156 toward an end. As shown in FIG. 14(a), the amplitude of the electric signal which is output from the CCD in accordance with the image is made lower as the scanning proceeds toward an end of the linear arrangement. When a thin bar of the bar code exists at a position corresponding to the end, the received light has a higher frequency so that the amplification factor of the logarithmic amplifier is lowered as a result of its characteristics.

In the logarithmic amplifier 159 which receives the electric signal, the input circuit comprises the parallel circuit of the input resistor 93 and the series circuit of the capacitor 95 and the resistor 96, and hence the impedance becomes higher as the frequency is lower so that the amplification factor is made larger for a higher frequency. As shown in FIG. 14(b), in the output of logarithmic amplifier 159, therefore, also the output for an electric signal obtained from an end portion of the CCD of the linear arrangement has a large amplitude. As a result, the whole of the output of the CCD is flattened in level so that a signal which can be correctly binarized is produced.

The member on which information such as a bar code is recorded may be continuously irradiated with light during a period of reading the information. A laser beam may be employed in the scanning by using a rotating polygon mirror or an oscillating mirror. The photoelectric converting elements may comprise photodiodes or the like in place of the CCD.

As seen from the above description, according to the invention, the light-emitting faces of the chip-type LEDs having a parallelpiped shape are in a plurality of planes which are perpendicular to one common plane, respectively, and hence the direction of light emitted from each of the chip-type LEDs can be arbitrarily set. Therefore, the distribution of the quantity of light can be set in an arbitrary manner. According to the invention, particularly, light emitting elements themselves are not directly mounted on a printed circuit board and the chip-type LEDs having a parallelpiped shape are mounted on a printed circuit board, thereby allowing the LEDs to be mounted by a general purpose mounting machine. Furthermore, the positional accuracy of the mounting is not so severe. Therefore, the mounting cost can be reduced. Since it is not required to form concave curved portions or the like in the projection lens, the cost of molds for the projection lens can be reduced. Since chip-type LEDs are used, the lighting apparatus can be miniaturized. Since chip-type LEDs having a parallelpiped shape are mounted, the positioning can be easily performed and the accuracy of the positioning is improved.

When the one common plane is set to be the surface of the printed circuit board, the printed circuit board can be configured by a conventional flat printed circuit board.

When an edge of the printed circuit board has a shape which elongates along the light-emitting faces, light is prevented from being blocked by the printed circuit board.

When a slit-like positioning groove into which a respective end of the printed circuit board is to be inserted is formed in the board supporting portions of the projection lens, the optical axis of each light emitting face can be prevented from being deviated from that of the projection lens by a simple structure.

When an elastic member is disposed on the bottom face of the trough-like holding member which houses and holds the projection lens and the printed circuit board, the printed circuit board is prevented from rattling, and provided with sufficient electrical insulation by a simple structure.

When an L-like engagement notch which engages with the engagement protrusion of the projection lens is formed in the holding member, the projection lens can be easily attached to the holding member and hence the assembly property is improved.

When a window is formed so as to extend over the front portion of the case and a side portion which is continuous with the front portion, the irradiation width can be increased without requiring the lighting apparatus to be enlarged.

As seen from the above description, according to the invention, a parallel circuit of an input resistor and a series circuit of a capacitor and another resistor is connected as the input circuit of the logarithmic amplifier to which an output signal of an image sensor is input. Therefore, the impedance of the logarithmic amplifier is varied in accordance with the frequency and the amplification factor is made larger as the frequency is higher. Even a signal obtained from a bar code consisting of thin bars or narrow gaps is enhanced in amplitude so that the output of the logarithmic amplifier has a waveform which can be easily binarized. Consequently, the optical information reading apparatus can sufficiently cope with bar codes consisting of bars of various thicknesses, or the like.

In the case where an optical information reading apparatus is miniaturized by using a lens of a wide field angle, when the specifications of the reading width remain unchanged from those of the conventional one, an output signal corresponding to an end of the image sensor has a lower amplitude. When a thin bar is to be read, furthermore, the amplification factor is lowered. Also in such a case, it is possible to obtain an output which can be easily binarized, with the result that the optical information reading apparatus can be miniaturized.

We claim:

1. A lighting apparatus comprising:

a plurality of light emitting diodes;

a printed circuit board on which said light emitting diodes are arranged in one row; and a rod-shaped projection lens disposed in front of said light emitting diodes along a light emitting direction, for irradiating an object with light in a strip manner, wherein each of said light emitting diodes is a chip light emitting diode which has a substantially parallelpiped shape and which comprises a light-emitting face and a pair of electrode faces, said light-emitting faces are in a plurality of planes which are perpendicular to one common plane, respectively, and wherein a surface of said printed circuit board is positioned in said one common plane.

2. The lighting apparatus according to claim 1, wherein an edge of said printed circuit board has a shape along the light-emitting faces.

3. The lighting apparatus according to claim 1, wherein a board supporting portion is formed in each of ends of said rod-shape projection lens in a longitudinal direction of said lens, said board supporting portions each having a slit-shape positioning groove into which a respective end of said printed circuit board is to be inserted.

4. The lighting apparatus according to claim 3, wherein said lighting apparatus further comprises a trough-shaped holding member which houses and holds said projection lens and said printed circuit board, and an elastic member is disposed on a bottom face of said holding member, said elastic member contacting with an edge of said printed circuit board which is in a side opposite to said projection lens.

5. The lighting apparatus according to claim 4, wherein a plurality of engagement protrusions are integrally formed on a side face of said projection lens, and a plurality of engagement notch portions which respectively guide said engagement protrusions are formed in said holding member, said notch portions each having an L-shaped notch which engages at an inner most position with respective one of said engagement protrusions.

6. The lighting apparatus according to claim 1, wherein said lighting apparatus further comprises a case which houses said projection lens and said printed circuit board, and which has a window through which light emitted via said projection lens from said chip light emitting diodes passes, said window being in a front portion of said case and a side portion which is continuous with said front portion.

7. The lighting apparatus according to claim 1, wherein said lighting apparatus further comprises a case which houses said projection lens and said printed circuit board, and which has a window through which light emitted via said projection lens from said chip light emitting diodes passes, said window being in a front portion of said case and a side portion which is continuous with said front portion.

8. The lighting apparatus according to claim 1, wherein said projection lens is a cylindrical lens.

9. The lighting apparatus according to claim 1, wherein each of said light emitting diodes has an inclined angle with respect to the object to be irradiated, and wherein said inclined angle of a corresponding one of said light emitting diodes located near the center of said printed circuit is larger than said inclined angle of a corresponding one of said light emitting diodes located farther from the center of said printed circuit.

10. The lighting apparatus according to claim 1, wherein said light emitting diode located near the center of said printed circuit has an inclined angle that is smaller than an inclined angle of said light emitting diode located farther from the center of said printed circuit.

11. An optical information reading apparatus, comprising:
   a lighting device including,
      a plurality of light emitting diodes,
      a printed circuit board on which said light emitting diodes are arranged in one row, and
      a rod-shaped projection lens disposed in front of said light emitting diodes along a light emitting direction, for irradiating an object with light in a strip manner,
      wherein each of said light emitting diodes is a chip light emitting diode which has a substantially parallelpiped shape and which comprises a light-emitting face and a pair of electrode faces, and wherein said light-emitting faces are in a plurality of planes which are perpendicular to one common plane, respectively;
   means for receiving the light irradiated from said lighting device; and
   means for processing the light received by said receiving means,
   wherein a surface of said printed circuit board is positioned in said one common plane.

12. The optical information reading apparatus according to claim 11, wherein an edge of said printed circuit board has a shape along the light-emitting faces.

13. The optical information reading apparatus according to claim 11, wherein a board supporting portion is formed in each of ends of said rod-shaped projection lens in a longitudinal direction of said lens, said board supporting portions each having a slit-shaped positioning groove into which a respective end of said printed circuit board is to be inserted.

14. The optical information reading apparatus according to claim 13, wherein said lighting device further comprises a slit-shaped holding member which houses and holds said projection lens and said printed circuit board, and an elastic member is disposed on a bottom face of said holding member, said elastic member contacting with an edge of said printed circuit board which is in a side opposite to said projection lens.

15. The optical information reading apparatus according to claim 14, wherein a plurality of engagement protrusions are integrally formed on a side face of said projection lens, and a plurality of engagement notch portions which respectively guide said engagement protrusions are formed in said holding member, said notch portions each having an L-shaped notch which engages at an inner most position with respective one of said engagement protrusions.

16. The optical information reading apparatus according to claim 11, wherein said lighting device further comprises a case which houses said projection lens and said printed circuit board, and which has a window through which light emitted via said projection lens from said chip light emitting diodes passes, said window being in a front portion of said case and a side portion which is continuous with said front portion, whereby said lighting device irradiates the light to the object which has a larger width than said lighting device.

17. The optical information reading apparatus according to claim 11, wherein said lighting device further comprises a case which houses said projection lens and said printed circuit board, and which has a window through which light emitted via said projection lens from said chip light emitting diodes passes, said window being in a front portion of said case and a side portion which is continuous with said front portion, whereby said lighting device irradiates the light to the object which has a larger width than said lighting device.

18. The optical information reading apparatus according to claim 11, wherein said projection lens is a cylindrical lens.

19. The optical information reading apparatus according to claim 11, wherein each of said light emitting diodes has an inclined angle with respect to the object to be irradiated, and wherein said inclined angle of a corresponding one of said light emitting diodes located near the center of said printed circuit is larger than said inclined angle of a corresponding one of said light emitting diodes located farther from the center of said printed circuit.

20. The optical information reading apparatus according to claim 11, wherein said light emitting diode located near the center of said printed circuit has an inclined angle, with respect to the object to be irradiated, that is smaller than an inclined angle of said light emitting diode located farther from the center of said printed circuit.

21. A lighting apparatus comprising:
   a plurality of light emitting diodes;
   a printed circuit board on which said light emitting diodes are arranged in one row; and
   a rod-shaped projection lens disposed in front of said light emitting diodes along a light emitting direction, for irradiating an object with light in a strip manner,
   wherein each of said light emitting diodes is a chip light emitting diode which has a substantially parallelpiped shape and which comprises a light-emitting face and a pair of electrode faces,
   said light-emitting faces are in a plurality of planes which are perpendicular to one common plane, respectively, and
   wherein each of said light emitting diodes has an inclined angle with respect to the object to be irradiated, and wherein said inclined angle of a corresponding one of said light emitting diodes located near the center of said printed circuit is larger than said inclined angle of a corresponding one of said light emitting diodes located farther away from the center of said printed circuit.

22. An optical information reading apparatus, comprising:
   a lighting device including,
      a plurality of light emitting diodes,
      a printed circuit board on which said light emitting diodes are arranged in one row, and
      rod-shaped projection lens disposed in front of said light emitting diodes along a light emitting direction, for irradiating an object with light in a strip manner,
      wherein each of said light emitting diodes is a chip light emitting diode which has a substantially parallelpiped shape and which comprises a light-emitting face and a pair of electrode faces, and wherein said light-emitting faces are in a plurality of planes which are perpendicular to one common plane, respectively;
   means for receiving the light irradiated from said lighting device; and
   means for processing the light received by said receiving means,
   wherein each of said light emitting diodes has an inclined angle with respect to the object to be irradiated, and wherein said inclined angle of a corresponding one of said light emitting diodes located near the center of said printed circuit is larger than said inclined angle of a corresponding one of said light emitting diodes located farther away from the center of said printed circuit.

* * * * *